Aug. 3, 1943.    C. W. MOTT    2,325,870
TRACTOR CULTIVATOR
Filed Oct. 9, 1940    4 Sheets-Sheet 1

Inventor
Carl W. Mott
By Paul O. Pippel
Atty.

Aug. 3, 1943.  C. W. MOTT  2,325,870
TRACTOR CULTIVATOR
Filed Oct. 9, 1940  4 Sheets-Sheet 2

Inventor
Carl W. Mott
By Paul O Pippel
Atty.

Aug. 3, 1943. C. W. MOTT 2,325,870
TRACTOR CULTIVATOR
Filed Oct. 9, 1940 4 Sheets-Sheet 4

Inventor
Carl W. Mott
By Paul O. Pippel
Atty.

Patented Aug. 3, 1943

2,325,870

UNITED STATES PATENT OFFICE 2,325,870

TRACTOR CULTIVATOR

Carl W. Mott, La Grange, Ill., assignor to International Harvester Company, a corporation of New Jersey Application October 9, 1940, Serial No. 360,440

18 Claims. (Cl. 97—50)

This invention relates to tractor cultivators and more particularly to the arrangement of the implement parts on the tractor and of the power means for the operation of the same.

It has been found desirable to have the rigs at the opposite sides of the tractor independently operable with respect to each other. Such an arrangement has particular adaptation for the cultivation of row crops which run into a point at the end of the field wherein it is desirable to maintain the implements at one side of the tractor in the ground for a time later than for the implement on the other side which was first to arrive at the end of the pointed row. While such arrangements have been provided for independent movement of the implements at one side of the tractor, the same has not been provided so that successive operation of the implements at each of the respective sides of the tractor may be effected.

Therefore, it is the principal object of the invention to provide an arrangement wherein successive movement of front and rear implements at one side of the tractor may be had at one time independent of any movement of the front and rear implements at the opposite side of the tractor.

It is another object of the invention to provide in connection with a plurality of implements located at different locations on the tractor, individual locking means whereby any one or more of the implements may be locked in one of their positions to thereby permit movement of any one or more of the implements independently of the locked implements.

It is a still further and a specific object of the invention to provide an arrangement for the attachment of a biasing means whereby the same may serve as a hold down spring for an implement as well, to serve as an assisting spring for the adjustment of the implement and for simple means for rendering the same ineffective as a hold down spring automatically with the operation of the power means.

It is a still further object of the invention to make use of the usual implement attachment or connecting means provided on a tractor for the attachment of the supporting structure for the various auxiliary parts and which is provided with means adapted to readily cooperate with the implement connecting means of the tractor.

According to the present invention there has been provided a power operable means including a pair of fluid actuating cylinders located at each side of the tractor and adapted to be anchored to the tractor through a manual adjusting means, whereby bodily movement of the same is effected to in turn effect positioning of the implement rigs. Each of these fluid actuating cylinders has associated with it a lost motion or double tree arrangement which is connected with the implements on the forward and rearward portions of the tractor. The implement rigs on the forward portion of the tractor are connected with this lost motion means or double tree means more or less directly while the connection of the implements on the rearward portion of the tractor is connected by means of a lever arrangement so constructed and arranged as to provide automatically delaying movement of the rear rig and prior operation of the rig on the forward portion of the tractor. Associated with the lost motion means and accessible to the operator on the tractor, there is provided individual locking devices whereby any one of the implement rigs at either side of the tractor at either the forward or rearward portions thereof may be locked out of operation in either their transport or working position.

Associated with the adjusting means is a spring biasing means which serves to assist in the adjusting operation of both forward and rearward rigs, and this spring biasing means is also connected to act as a hold down pressure spring for the implement rig on the rearward portion of the tractor. The adjusting means, the spring biasing means, and a lifting lever forming a part of the arrangement for causing the delaying movement of the implement rig on the rearward portion of the tractor are all mounted on a single bracket structure and this structure may be removed from the tractor as a unit. By being able to remove the spring biasing means without detachment of the same from its connections, the usual fighting necessary for the attachment and detachment of such springs is no longer a problem. For other objects and a better understanding of the invention, reference may be had to the following detailed description taken in connection with the accompanying drawings, in which:

Figure 1:
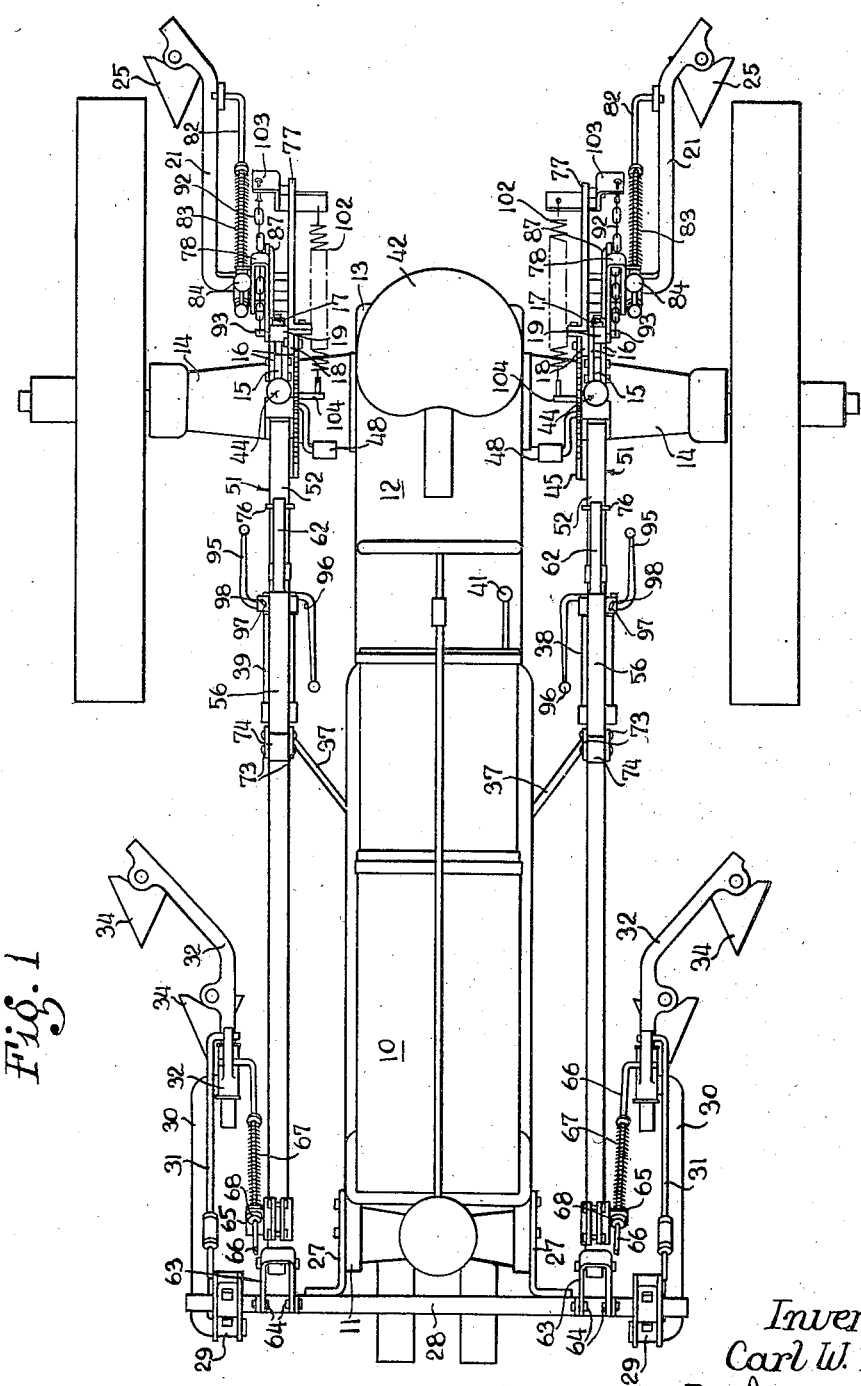
Figure 1 is a plan view of a tractor with the implements located at each side thereof and on the forward and rearward portions thereof and showing in addition the connections of the power means with the implements, all of which forming part of the present invention.

Referring now to the figures there is shown a tractor 10 having a forward portion 11 and a rearward portion 12. The rearward portion of the tractor includes a transmission and differential housing 13 extending laterally from which are the transverse axle housings 14 having associated with the same a flange plate 15 which serves to support the connecting plates 16 of the tractor for the connecting of the implements. To these attaching plates 16 there are connected any of the usual implement attachments which have cooperating means for receiving of quick attaching bolts 17 forming a part of the attachable means of the tractor. In this instance use is made of these attachable plates and there is connected to the same a vertically extending bracket structure 18 having the cooperating part 19 adapted to be clinched by the attaching bolts 17. To this attaching part 19 of the bracket there is connected an attaching part 20 forming part of the implement rig 21 which is pivoted with respect thereto as indicated at 22. This attaching part 20 is fixed to the attaching part 19 of the bracket by a clamping swing bolt 23 pivoted on the bracket attaching part 19. The attaching part 20 is further maintained in its vertical position by a rearwardly extending lip portion 24 bent rearwardly from the attaching part 19. The rear implement rig 21 has a ground-working tool 25.

To the forward portion 11 of the tractor there is connected forwardly extending brackets 27 adapted to support a transversely extending tool bar 28 to which may be clamped implement rig supporting brackets 29. To these brackets 29 there are pivoted spaced links 30 and 31 pivotally connected at their rear ends to a rig beam supporting bracket 32 having the rig beam 33 connected thereto. Connected to the rig beam 33 are forward ground-working tools 34.

Connected to the transmission housing to be operably driven by parts within the same, is a pump housing 36 adapted to extend forwardly thereof and being of sufficient size as to serve as a reservoir for the actuating fluid. This pump and reservoir housing takes the form of that shown in the Patent No. 2,213,401, issued September 3, 1940, in the names of A. C. Lindgren and C. W. Mott. This housing 36 also has a control mechanism for diverting fluid through fluid connections 37 to fluid actuating cylinder devices 38 and 39 respectively located at each side of the tractor. This control mechanism is likewise similar to that shown in the above mentioned patent and has an external control level 40 accessible by a rearwardly extending rod 41 to the operator's station 42 on the rearward portion 13 of the tractor. By the same lever 40 the fluid actuating cylinders 38 may be caused to return to their unextended positions.

There is one of these bracket structures 18 connected at each side of the tractor, and there is associated with each structure a manual adjusting mechanism 44 comprising a quadrant 45 and an operating lever 46 pivoted at 47 to the quadrant 45. Associated with the lever 46 is a crank operated mechanism 48 similar to that shown in my Patent No. 2,228,530. By operation of the crank thereof the lever 46 is made to travel about its pivot point 47 and over the quadrant 45 to thereby effect manual adjustment. At a location above the pivot connection 47 of the lever 46 there is pivoted at 50 a member 51 extending forwardly and having at its forward end thereof a sleeve portion 52 adapted to receive a sleeve portion 53 rigid with the cylinder device 38 and through which there extends a piston rod not shown but adapted to abut the rearward end of the sleeve portion 52 of the member 51. The fluid device is thus constructed in this regard as shown in my Patent No. 2,209,032 relating the fluid devices. The sleeve portion on the member 51 thereby serves as a support for the cylinder device 38. For a more detailed understanding of the cylinder device, reference may be had to the Patent 2,156,570 issued May 2, 1939, to A. C. Lindgren. Fluid passes to the cylinder device 38 from the fluid connection 37 at which time the outer cylinder part of the device will be extended and the sleeve portion 53 will be protruded from the sleeve portion 52 of the member 51, as shown more specifically in Figures 3 and 4. The cylinder device will thereby have reacted against a part directly connected thereto; and thereby in effect reacts against the tractor.

On the sleeve portion 52 there is connected a bracket portion 55 having hinged thereto a pair of spaced sleeves 56 and 57, one above the cylinder device and another below the same. These sleeves 56 and 57 are weldedly connected at their rearward ends to hinge brackets 58 and 59 respectively adapted to be retained for pivotal movement in a vertical plane as indicated at 60 and 61, respectively.

Extending through the upper sleeve 56 is a rod 62 running forwardly along the side of the tractor and connected at its forward end to a pivoted lifting lever 63 pivoted at 64 to the forward transverse supporting structure 28. Connected to the rod 62 at a location near to its point of connection with the lever 63 is a laterally extending flange means 65 through which extend the lifting rods 66 which may have the usual pressure spring means 67. Lifting of the implement rig at the forward portion of the tractor is effected through the lifting rod 66 by forward movement of the rod 62 to cause the flange means 65 to engage with the collars 68 fixedly connected to the upper end of the lifting rods.

Extending through the lower sleeve 57 is a rod 69 adapted for sliding movement therethrough. To the rearward end of this rod 69 there is connected the lifting connection for the rear implement to be described more in detail hereinafter.

Figure 2:
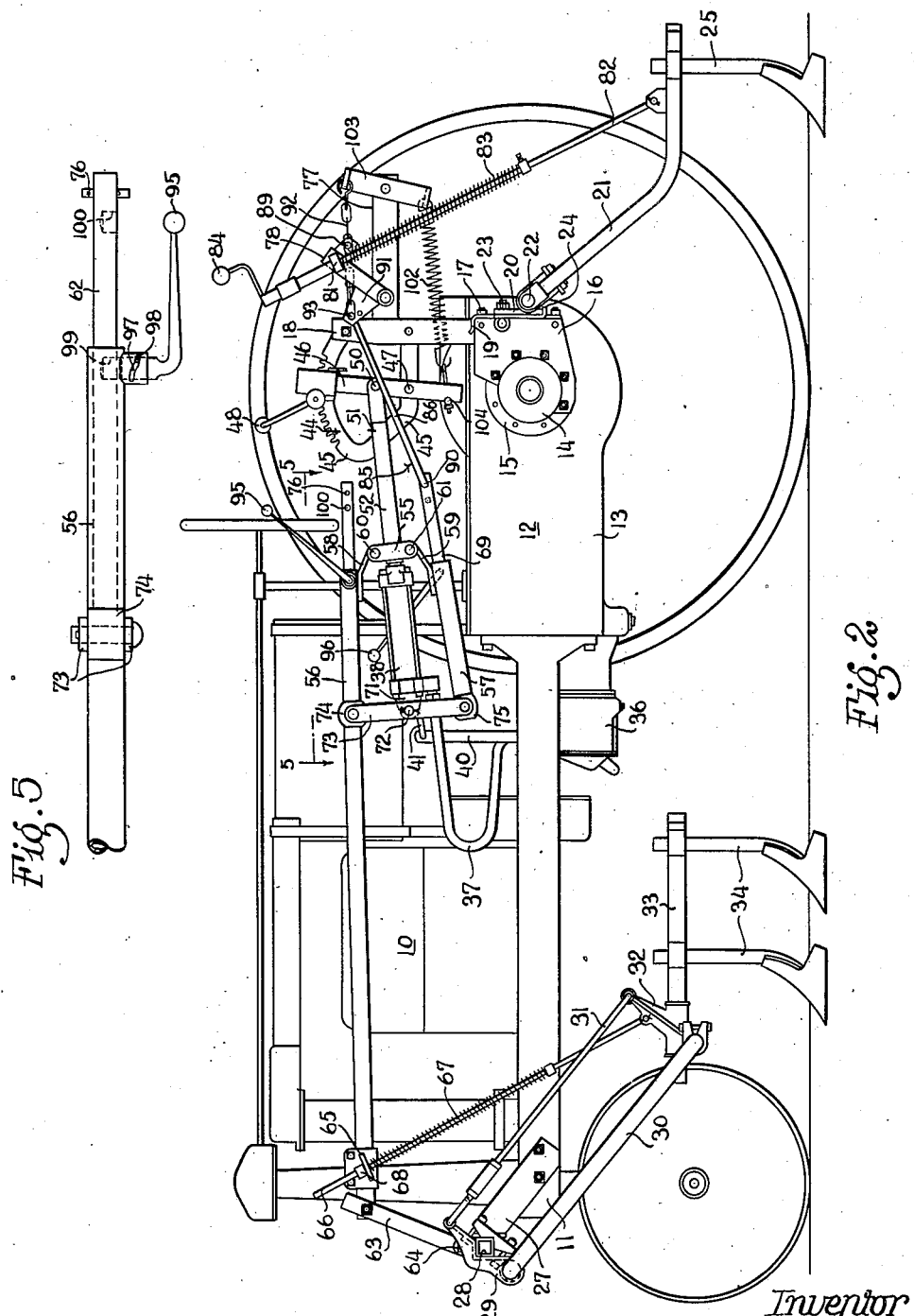
Figure 2 is a side view in elevation of a tractor and of the implements on one side of the tractor in their ground-working position and illustrating the position of the parts forming the present invention with the implements in their ground-working position.

On the forward portion of the cylinder device 38 there is provided a bracket portion 71 to which is pivotally connected as indicated at 72, a double tree 73 at a point intermediate its length thereof. This double tree means 73 may include a pair of spaced plates, one on each side of the bracket portion 71 and having their ends pivotally connected to enlarged portions 74 and 75, respectively, forming a part of the rods 62 and 69. Referring now to Figure 2, it will be noted that the rods 62 and 69 both extend rearwardly from the sleeves 56 and 57 and the portions 74 and 75 thereby abut the forward end of the sleeves 56 and 57, respectively. The cylinder device in this position is unextended and the sleeve 53 thereof is substantially fully within the sleeve portion 52 of the member 51.

Figure 3:
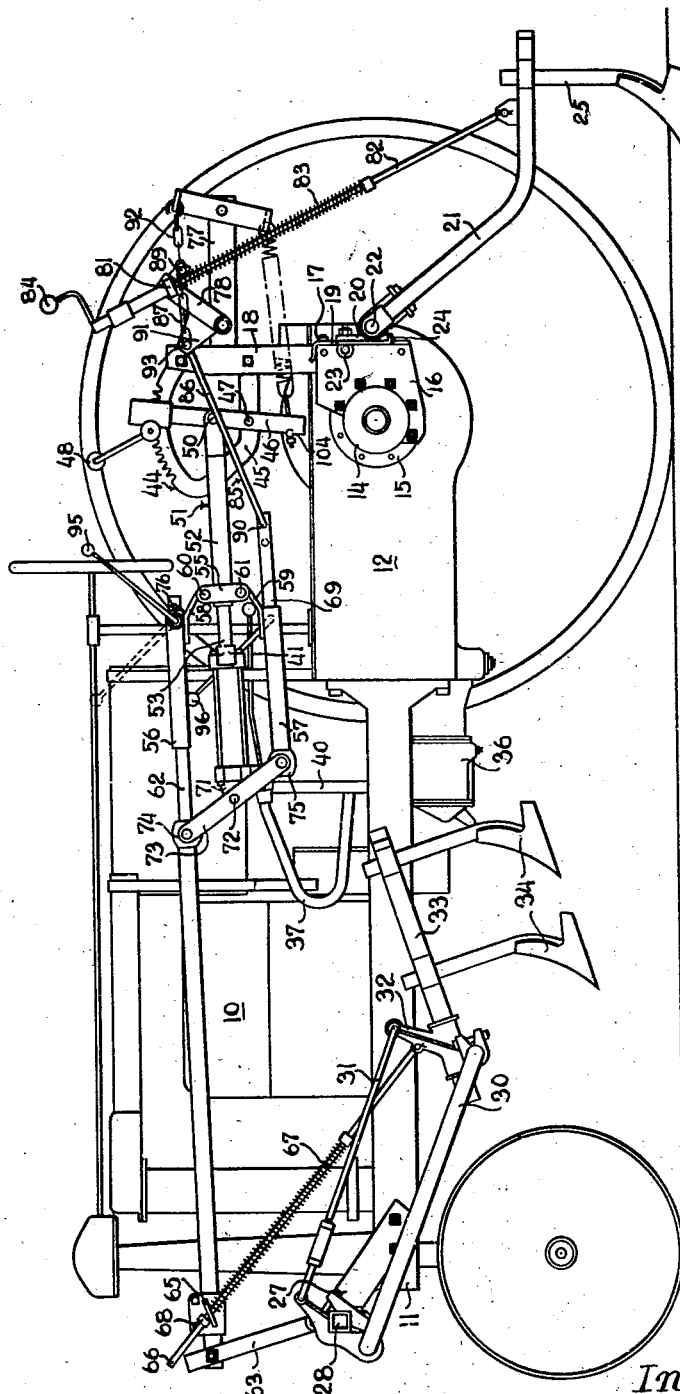
Figure 3 is a view similar to Figure 2 of a tractor but illustrating the position of the parts of the present invention showing the implement rig on the forward portion of the tractor raised and the implements on the rearward portion of the tractor still in their ground-working position.

When the cylinder device 38 is extended, movement of the rod 62 will first be effected during part of its stroke to cause the implement rig on the forward portion of the tractor to be first raised to its transport position and the same taking the position shown in Figure 3. The rod 62 will travel forwardly until the rear end of the sleeve 56 is abutted by a transverse pin 76 in the rear end of the rod 62. Since the rear implement has been so connected to the rod 69 by means to be hereinafter described as to first effect resisting movement of the double tree means 73 at its lower end, the upper end of the double tree 73 will first go forward. Thus, it will be noted that a lost motion means has been provided wherein movement is first imparted to the forward implement rig before movement is imparted to the rearward implement rig. As further movement is imparted to the cylinder device to complete its stroke, the double tree will then pivot about the portion 74 causing the rod 69 to be moved forward and taking with it the rear implement rig.

The maintaining means for the rear rig will now be described. Extending rearwardly from the bracket structure 18 is a portion 77 on which is pivoted a rear pivoting lever 78 as indicated at 79. To the extended free end of this lifting lever 78 there is connected, by means of a swivel connection 81, a lifting rod 82 having the usual pressure spring means 83. The upper end of this lifting rod 82 has an adjustable manually operable stop means 84 whereby an adjustment of the rear rig is effected independently of the adjustment of the forward rig and relative to the same.

Also connected to the free end of the rear lifting lever 78 is a link connection 85 made in two parts 86 and 87 to provide a pivot union 88 intermediate the length of the same. The link connection 85 is connected to the lifting lever 78 as at 89 and to the rear end of the rod 69 as at 90, being turned inwardly to pass through an opening in the end of the rod 69 and to provide at the same time a stop means, similar to the stop pin 76, against which the end of the cylinder 57 abuts during the lifting movement of the implement rig. Formed on the lifting lever 78 is an upwardly and forwardly extending bracket portion 91 to which is connected a flexible chain means 92 by means of a laterally extending pin 93. The distance between the pivot connection 89 and the pin 93 is substantially the same distance as the length of the link 87 forming a part of the link connection 85. When both of the implement rigs are in their ground-working positions, as shown in Figure 2, the lever 78 is in a position whereby the link connection 85 is bent upwardly about the pin 93 at the pivot union 88 between the parts 86 and 87 thereof. By merely permitting this link connection 85 to buckle there is effected an alinement of parts whereby the connection of the link 85 with the lever 78 gives less opportunity for the link 84 to interfere with the laterally extending parts of the lever 78 whereby the same may be caught during operation.

It will be noted that the upper end of the lifting rod 82 is substantially rearwardly of the pivot point 79 of the lever and that the effective lifting arm between its swivel connection 81 and the pivot point 79 of the lever is substantially greater than the effective pulling arm of the link connection 85 with the lever 78. Since the effective arm for the connection of the rear lifting rod 82 is greater than the effective arm for the connection of the link connection 85, both of which with respect to the pivot point 79, the weight of the implement will have a greater effect to thereby resist its movement upon operation of the fluid actuating cylinder 38. Thus, as the actuating cylinder 38 is extended, the forward rig will be first raised, and then when the resisting force of the rear rig is overcome, the rear rig will then be raised so that the same will take the position shown in Figure 4.

Figure 4:
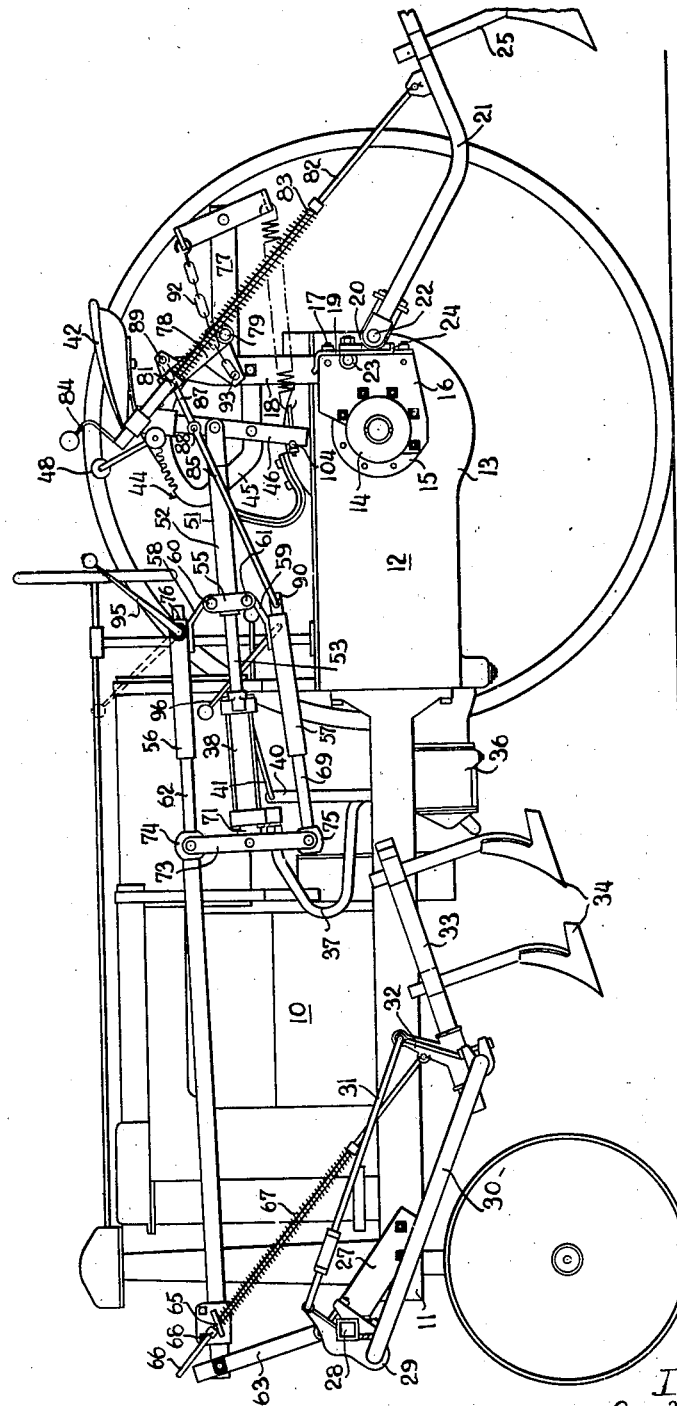
Figure 4 is also a view similar to Figure 2 illustrating the position of the parts when the actuating cylinders have been fully extended and both the implements at forward and rearward portions have been raised; and, Figure 5 is a detail view of the locking device for one of the implements taken along the lines 5—5 of Figure 2.

In the raised position shown in Figure 4, it will be noted that the link connection 85 has become straightened and that its effective arm between its point of connection 89 with the lever 78 and the pivot point 79 thereof, is substantially greater than the effective arm between the swivel connection 81 for the lifting rod 82 and the pivot 79 of the lever 78. Thus, the tendency for the rear rig to lower is greatly reduced since the mechanical advantage is in favor of the link connection side of the pivot 79. Therefore, upon the lowering of the implements, the forward rig will be free to lower prior to the lowering of the rear rig, the rear rig in its raised position will thereby offer greater resistance to lowering than the forward rig. It should thus be noted that means has been provided for so connecting the rear rig to the actuating cylinder device that automatically greater resistance is provided by the rear rig for both the raising and lowering operations of the power means to thereby automatically provide successive movement of forward and rearward rigs in both the raising and lowering movements of the same.

Associated with each of the sleeves 56 and 57 are locking levers 95 and 96, respectively. The lever 95 serves to lock the implement on the forward portion of the tractor whereas the lever 96 serves to lock the implement on the rearward portion of the tractor. As seen from Figure 5, it will be noted that this lever is adapted to be moved into the sleeve by means of a cam track 97 acting upon a pin projection 98 forming a part of the locking lever. In the rods 62 and 69 there are provided recesses 99 and 100. When one of the rods has moved forwardly so that either a pin 76 or the end 90 of the link connection 85 abuts the rear end of its respective sleeve, the locking lever may be moved so that its projection will project into the sleeve and into the recess 100. When a rod is moved rearwardly, so that its portion 74 or 75 for the double tree member engages a forward portion of the sleeve, the locking lever will be in position so that its projection may be inserted into the recess 99 of the rod. When the locking lever is in the recess 100 the implement rig connected to that particular rod will be retained in its raised position whereas when the locking lever is in the opening 99 of the rod, the particular implement will be maintained in its ground-working position. It should thus be apparent that there has been provided locking means for each of at least four implement rigs located on the tractor. By locking any one or more of the implement rigs, operation will only be made as to those rigs which are unlocked.

By this locking means it should thus be apparent that the rigs on one side of the implement may both be locked leaving the rigs on the other side of the implement free for movement. This is particularly helpful in the cultivation of row crops which come to the end of the field at a point. The operator may have the rigs on the side of the tractor that are the last to reach the end of the field arranged in their locked down position whereupon when the operating lever 40 is moved to effect raising of the implements, only the implements on that side of the tractor first arriving at the end of the field will be raised. Since there has been provided automatic means for having successive movement of the front and rear rigs, the rigs first arriving at the end of the field, on the side of the tractor, will be automatically moved in consecutive order providing they are unlocked. After these rigs have been moved to their raised position the operator may then unlock the rigs at the opposite side and successive movement of these latter rigs will also be automatically obtained.

When the locking lever is in the position shown in Figure 5, it is out of connection with the rod 62. But, when the lever is moved forward to a position shown dotted in Figure 4, the same will be locked with the rod 62.

The bracket structure 18 illustrated, also serves as a support for a combination pressure spring and assisting spring biasing means 102. This biasing means is wholly supported on the bracket structure 18 and connected at its rearward end to a lever 103 pivoted on the rearwardly projecting portion 77. At its forward end the biasing spring 102 is adjustably connected by means 104 to the lower end of the adjusting lever 46. The upper end of the lever 103 is connected by means of the flexible chain 92 to the pin 93 connected to the bracket portion 91 of the lever 78. This biasing spring 102 serves to maintain the rear rig in its ground-working position. This is effected by a rearward pull on the chain means 92 to cause clockwise pivoting of the lever 78 against the pressure spring means 83 on the lift rod 82.

By having this same spring 102 connected to the adjusting lever 46 it will be noted that the same serves as well to assist in the adjusting of the lever 46. This lever 46 when adjusted bodily moves the fluid actuating device to thereby effect simultaneous adjustment of the forward and rearward implement rigs. While the necessity for having an assisting spring is not so great with the adjusting crank mechanism 48 utilized for effecting adjustment, it does serve and is convenient where the usual manual type of adjusting means is used. It should also be noted that the spring means 102 is wholly associated and connected with the adjusting bracket 18 and which as well carries the adjusting mechanism. By so having the same arranged in this manner, the spring can be taken from the tractor with the adjusting means whereby the usual fighting of making the connection of the individual springs is eliminated. The operator will no longer need to separately attach the spring or to make a new initial adjustment of the same when placing the same onto the tractor.

It will be noted that the chain means 92 will wrap itself about the pivotal connection 79 of the lever 78 when the rear rig is raised. By so effecting this the force of the spring tending to resist lifting movement of the power means will be greatly reduced or substantially ineffective when the rig is lifted. The forward end of the flexible means at 93 is brought over a center position whereby the pulling force of the spring means 102 is not so effective as when the lever 78 is in the position shown in Figure 2 with the rear implement rig in the ground-working position.

It should also be apparent that with the bracket structure 18, which is adapted to be attached to the usual tractor implement connecting means on the tractor, that there has been provided a simplified structure such that auxiliary parts including the spring means 102, the adjusting mechanism 44, and the lever 78 can readily be removed from the tractor as a unit.

While various changes may be made in the detail construction of the arrangement, it shall be understood that such changes shall be within the spirit and scope of the present invention as defined in the appended claims.

What is claimed is:

1. In combination, a tractor having forward and rearward portions, implements connected respectively to the forward and rearward portions of the tractor for movement from one position to another position, power means associated with the tractor and connected with the implements to move the same, selector devices associated respectively with each of the implements for locking any one or more of the same against movement from one position to another position whereby upon operation of the power means only certain of said implements will be moved.

2. In combination, a tractor having forward and rearward portions, implements mounted on said tractor for vertical movement to and from their ground-working position, a pair of implements at each side of the tractor connected respectively to the forward and rearward portions of the same, power means for moving the implements including actuating means disposed at each side of the tractor and so constructed and connected to the forward and rearward implements as to effect successive movement respectively of the forward and rearward implements at the respective sides of the tractor from one position to another position when the power means is operated.

3. In combination, a tractor having forward and rearward portions, implements mounted on said tractor for vertical movement to and from their ground-working position, a pair of implements at each side of the tractor connected respectively to the forward and rearward portions of the same, power means for moving the implements including actuating means disposed at each side of the tractor and so constructed and connected to the forward and rearward implements as to effect successive movements respectively of the forward and rearward implements at the respective sides of the tractor from one position to another position when the power means is operated, and manual means associated with each of the actuating means for locking out the implement at one side of the tractor to prevent operation of the same while permitting successive movement of the implements at the other side of the tractor.

4. In combination, a tractor having forward and rearward portions, implements mounted on said tractor for vertical movement to and from their ground-working position, a pair of implements at each side of the tractor connected respectively to the forward and rearward portions of the same, power means for moving the implements, locking means for each of the respective implements for locking out any one or more of the implements while permitting movement of any one or more of the other implements 5. In combination, a tractor having forward and rearward portions, ground-working implements respectively connected to the forward and rearward portions of the tractor for vertical movement to and from their ground-working position, single means common to both implements for successively moving the forward and rearward implements respectively including a lost motion connection to permit movement of the forward implement prior to movement of the rearward implement in both movements to and from their ground-working position.

6. In combination, an implement-carrying frame, implements respectively connected to said frame for movement from one position to another position, means common to both implements for successively moving the same including lost motion means and connections with the respective implements, the connections for one of the implements including linkage arranged to be effective when the implement is in either position to cause sufficient resisting force to be set up by the implement, whereby the movement of the other implement may precede the movement of the one implement.

7. In combination, a carrying frame, elements connected to the frame for movement from one position to another position, means common to both elements for successively moving the same including lost motion means and connections with the respective elements, the connections for one of the elements including a lever pivoted on the frame for connection with the one of said elements, the element tending at all times to resist movement in one direction and to react upon said lever, a connection between the lever and the lost motion means, the said connections with the lever removed from the pivot point and the location of the lever all being such that the action of the element in the one direction will provide sufficient resisting force to movement as to be delayed, whereby movement of the other element may precede the movement of the one element.

8. In combination, a tractor having forward and rearward portions, implements connected respectively to the forward and rearward portions of the tractor for movement from one position to another position, power means associated with the tractor, means for so connecting the implements to the power means as to normally provide successive movement of the implements on the forward and rearward portions respectively upon operation of the power means, and locking means associated with the connecting means for retaining any one of the implements in one of its positions whereby upon operation of the power means only the other of said implements will be moved.

9. In combination, a tractor having forward and rearward portions, implements connected respectively to the forward and rearward portions of the tractor for movement from one position to another position, power means associated with the tractor, means for so connecting the implements to the power means as to normally provide successive movement of the implements on the forward and rearward portions respectively upon operation of the power means, said connecting means including a double tree, means pivoted intermediate its length for angular movement, means for bodily moving the same and connections respectively between the portion of the double tree means on opposite sides of its pivot and the respective implements, the connection with the rear implement being so fashioned as to resist movement of the same while the forward implement is being moved.

10. In combination, an implement-carrying frame, implements respectively connected to the frame for movement from one position to another position, means connected to the implements to move the same including a double tree, means pivotally connected to the same intermediate its length thereof for bodily moving the same, and connections respectively between portions of the double tree on opposite sides of the pivotal connection with the moving means and the respective implements.

11. In combination, an implement-carrying frame, implements respectively connected to the frame for movement from one position to another position, means connected to the implements to move the same including a double tree, means pivotally connected to the same intermediate its length thereof for bodily moving the same, and connections respectively between portions of the double tree on opposite sides of the pivotal connection with the moving means and the respective implements, the entire arrangement being such that the moment of resisting force at one side of the pivotal connection is greater than on the other side thereof, whereby successive movement of the implements will be effected upon operation of the moving means.

12. In combination, a tractor, implements respectively connected to the tractor for movement from one position to another position, means for effecting successive movement of the implements including a double tree arrangement having pivotal connection intermediate its length, means for bodily moving the double tree, and connections between the respective implements and the double tree arrangement on opposite sides of the pivot thereof respectively, the connections for one of the implements being so fashioned so that movement thereof will be detained until the other implement has been moved.

13. In combination, a tractor, implements respectively mounted for movement on the tractor, means for moving the implements including a fluid operable cylinder device, means for connecting said device to the tractor to react against the same, a pair of sleeves connected to said cylinder connecting means to thereby react against the tractor, the connection being such that the sleeves are on opposite sides of the cylinder device and coextensive therewith, a rod extending through each of said sleeves and connected to an implement, a double tree pivotally connected intermediate its length to the cylinder device, and its portions at each side of its pivotal connection connected respectively to the rods whereby upon operation of the cylinder device the implements will be moved.

14. In combination, a tractor having forward and rearward portions, implements respectively connected to forward and rearward portions of the tractor for vertical movement to and from their ground-working position, an actuating cylinder device connected to the tractor to react against the same, a pair of sleeves running coextensively with the cylinder device, a rod extending through each of said sleeves and connected with an implement, a double tree connected between the rods and pivotally connected intermediate its length to the actuating cylinder device to be bodily moved thereby, causing movement of the rods through the sleeves, and locking means associated with the sleeves and adapted to act upon the rods respectively in a plurality of locations therealong whereby the implements may be respectively locked in either their working position or in a position removed from the working position and indepently of each other.

15. In combination, an implement-carrying frame, an implement mounted on the frame for movement from one position to another position, a lever pivoted on the tractor, connection means between the lever and the implement, means for operating said lever to effect movement of the implement, a second lever pivoted at a location removed from the first mentioned lever, biasing means connected between the said second lever and the tractor, flexible means between the two levers, the connection of the flexible means with the first mentioned lever being such with relation to the pivot location that upon operation of the lever to effect movement of the implement the flexible means will be thrown about the pivot location to lessen the action of the biasing means against movement of the lever upon moving the implement.

16. In combination, an implement-carrying frame, an implement mounted on the frame for movement from one position to another position, distorted biasing means connected to the implement to maintain the same in one of its positions with a force functional of its distortion, manual adjusting means for moving the implement from such position against the force of said biasing means, and said biasing means being reactively connected to the adjusting means and adjustable thereby to diminish such distortion and force of the biasing means that would otherwise prevail pursuant to the aforesaid movement of the implement.

17. In combination, an implement-carrying frame, a plurality of implements mounted on the frame for movement from one position to another position, biasing means connected to one of the implements to maintain the same in one of its positions, manual adjusting means for positioning another of the implements, said biasing means being connected to the adjusting means to assist in the working of the same, whereby said biasing means serves as well for assisting in the adjustment of the other of the implements as for maintaining of the one of the implements.

18. In combination, an implement-carrying frame, a plurality of implements mounted on the frame for movement from one position to another position, distorted biasing means connected to one of the implements to oppose movement of the same from one of its positions with a force functional of the degree of such distortion, manual adjusting means for positioning another of the implements, and said biasing means being reactively connected to the adjusting means to apply thereto the force reactive to the aforesaid force to assist in the working of the same for effecting said positioning of the other implement.

CARL W. MOTT.